Dec. 25, 1956  W. S. HERBERT  2,775,534
PRIMARY DRY CELL
Original Filed July 8, 1949  2 Sheets-Sheet 1

INVENTOR.
William S. Herbert
BY
Beale and Jones
ATTORNEYS

Dec. 25, 1956  W. S. HERBERT  2,775,534
PRIMARY DRY CELL
Original Filed July 8, 1949  2 Sheets-Sheet 2

INVENTOR.
William S. Herbert
BY Beale and Jones
ATTORNEYS

United States Patent Office 2,775,534
Patented Dec. 25, 1956

2,775,534

PRIMARY DRY CELL

William S. Herbert, Madison, Wis., assignor to Ray-O-Vac Company, Madison, Wis., a corporation of Wisconsin Original application July 8, 1949, Serial No. 103,593, now Patent No. 2,650,945, dated September 1, 1953. Divided and this application August 31, 1953, Serial No. 377,321

9 Claims. (Cl. 136—139)

This invention relates to a primary dry cell and with more particularity a primary dry cell wherein an alkaline electrolyte is employed. This application is a division of my copending application, Serial No. 103,593, filed July 8, 1949, now U. S. Patent No. 2,650,945, issued September 1, 1953.

The present invention contemplates an alkaline dry cell which, for the first time, will make available for mass production and reliable usage a primary alkaline dry cell which will satisfy the following objectives:

A dry cell with high capacity per unit volume. A dry cell so constructed as to have its terminals at opposite ends (or sides) of the cell, thus making quite simple the construction of multiple cell batteries. A dry cell which has virtually no leakage of electrolyte or other materials after discharge, or during discharge. A dry cell in which the gas generation is so minimized, both during and after discharge that no provision need be made for venting the cell, with the increased danger of electrolyte leakage which accompanies such vents. A dry cell in which such gas as is generated is in amounts so small that the generated gas may be confined within the interior of the cell and when so generated, at most has a tendency to expand, very slightly, the end terminals of the cell, thus increasing desired cell-to-cell contact in multiple cell batteries. A dry cell with a gradual voltage drop near the end point so that the need of replacement is indicated to the user. A dry cell with a depolarizer which is not only cheap but is formed of ingredients which are almost completely insoluble in alkaline electrolytes, thus eliminating the harmful effects on any absorbent material, and on the zinc anode, which have characterized prior art alkaline cells. An alkaline dry cell which does not require the use of an expensive grommet and which does not require the use of a barrier between the depolarizer and any adsorbent used. A dry cell which is capable of withstanding relatively high drains and which under abnormal drains possesses longer life and greater capacity than prior art dry cells of either the Leclanche type or the Lalande type.

The foregoing objects are obtained and the disadvantages of prior art dry cells are overcome by the alkaline dry cell which is the subject of this application. In the accompanying drawings, which illustrate one embodiment of the invention, like reference numerals refer to like or similar elements.

Figure 1:
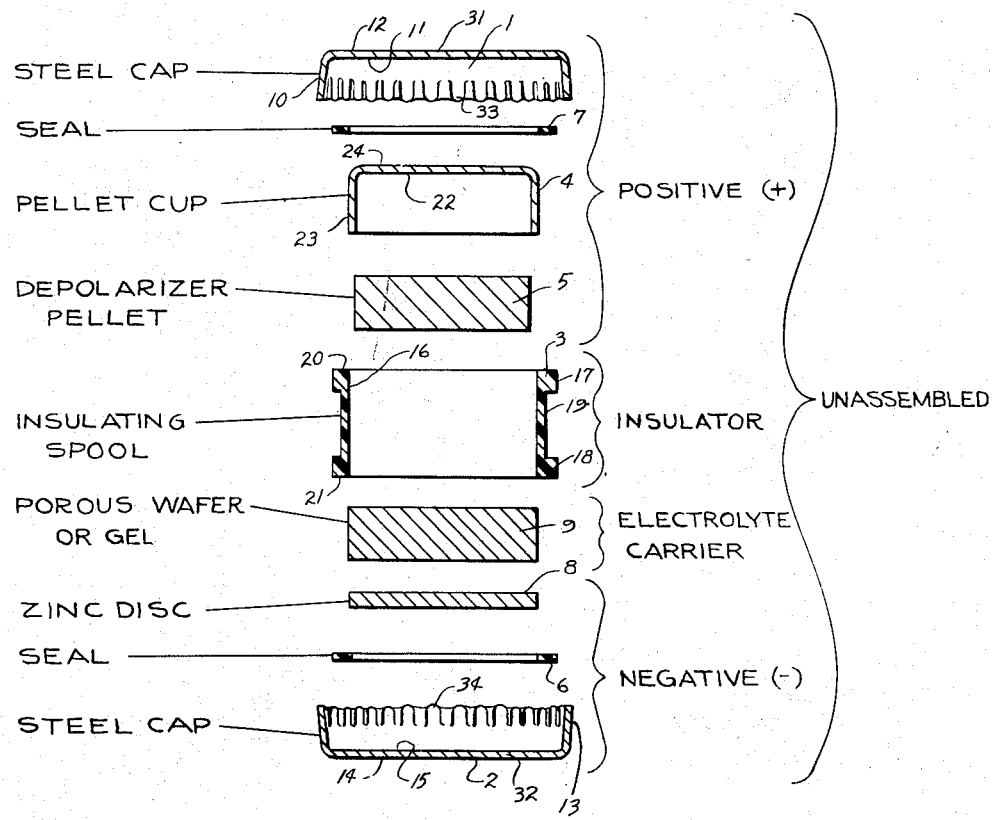
Figure 1 is a composite side elevational view, in cross-section, of the various elements of the cell and wherein the elements are unassembled.
Figure 2:
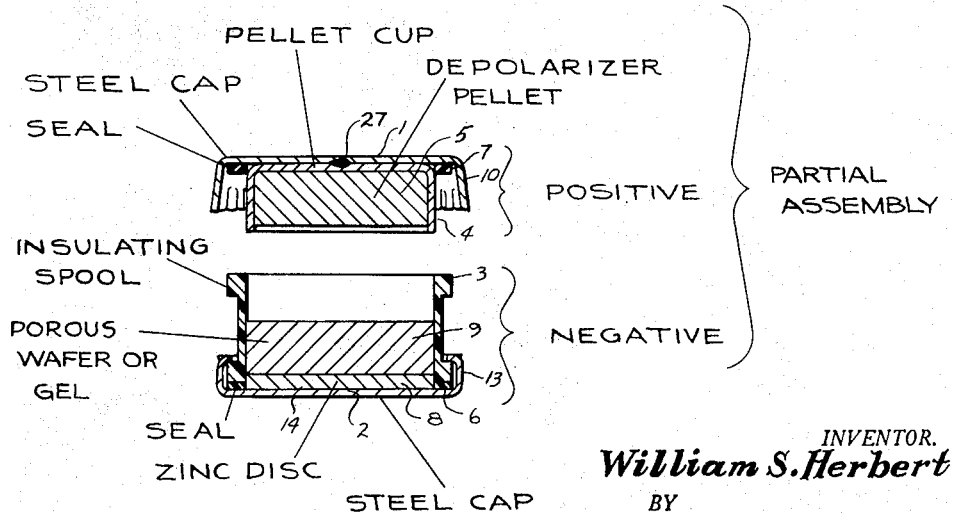
Figure 2 is also a composite side elevational view, in cross-section, of the partially assembled positive subassembly and the partially assembled negative subassembly, the two sub-assemblies being arranged in the manner in which they may be brought togther for final assembly.

Referring more particularly to Figures 1 and 2 of the drawings, the cell of the present invention is provided with the following component parts: a positive metallic cup 1 and a negative metallic cap 2; a substantially cylindrical insulating spool 3; a metallic pellet cup 4; a mass of depolarizer 5, which is preferably in the form of a pellet; a pair of seals or gaskets 6 and 7 which assist in obtaining a good closure; a zinc disc or wafer 8, and an electrolyte carrier 9 which may be a porous wafer or gel.

The structural elements of the cell are discussed in detail in a prior, copending application, Serial No. 103,593, filed July 8, 1949. The present aspect of the invention is concerned more particularly with the composition of the depolarizer mass or pellet 5, and with the method of making this mass or pellet. The following discussion is therefore primarily related to the depolarizer and the method of making it, and the disclosure of Serial No. 103,593, relating to the structure of the cell, is incorporated herein by reference.

The depolarizer pellet is preferably formed of an intimate mixture of finely divided manganese dioxide and graphite. It has been found desirable to preform the mixture by pressing the mixed components into the form of a pellet, (the compression being carried out under high pressure) and then inserting the pellet into the internal recess of the pellet cup. It is preferred to adjust the thickness of the depolarizer pellet so that it rests slightly below the outer rim of the side wall 23 of the pellet cup. It is difficult to insert the depolarizer pellet into the pellet cup, while having the exposed surface of the depolarizer pellet flush with the outer marginal rim of the side wall 23, without experiencing some chipping along the edges of the depolarizer pellet. The loosening or detaching of fragments of depolarizer caused by such chipping may cause some internal shorts, a result which is avoided by adjusting the thickness of the pellet so the pellet is recessed within, and does not occupy the entire capacity, of the pellet cup.

The zinc anode 8 may be used in several forms but in any form used is preferably amalgamated to a considerable degree. Desirably, the zinc anode is prepared in the form of a zinc wafer, pellet, or disc fabricated by amalgamating zinc powder and then pressing the amalgamated zinc powder into the form of a pellet utilizing moderate pressures. This produces appreciable porosity within the body of the pellet and increases the ability of the pellet to absorb some electrolyte. The zinc powder should be of relatively high purity and particular care should be taken to see that it is free from metals such as nickel, cobalt, or iron which are passive in an alkaline electrolyte. Whether a coherent zinc plate or a compressed powdered zinc pellet is used, the anode is preferably formed in the shape of a thin flat circular disc which has an exterior diameter very slightly less than the diameter of the interior bore of the insulating spool 3.

The electrolyte carrier 9 may be a gelled electrolyte. Preferably, however, a porous wafer is employed. This wafer should be formed of a highly porous material capable of absorbing and holding the electrolyte. It must also be capable of acting as a resilient spacing element so as to insure the physical separation of the zinc anode 8 from the depolarizer pellet 5. The wafer should have a high degree of moisture retentiveness while being expanded or contracted by forces operating within the cell—thus, it should not be readily deprived of absorbed electrolyte when compressed. The porous wafer should be highly resistant to chemical decomposition such as might be generated by an alkaline electrolyte. Ordinary paper and some forms of cellulosic materials have been tested but have been found to possess a tendency toward shrinkage upon continued exposure to alkaline electrolyte. This shrinkage is probably caused by chemical change rather than purely physical change in the structure of the cellulosic fibers. This tendency has been overcome by employing such materials as finely porous cellulose sponge or by pads made of loose absorbent paper composed of cotton fibers. As stated above, the electrolyte can also be in the form of a gel electrolyte. A pre-cast or pre-cut wafer of gel may be used. It is possible to use a film which swells to a gel when the electrolyte is added. It is also possible to combine, as a laminate or impregnate, a gel and a base such as a cellulosic wafer, so as to obtain the advantages of both gelled electrolyte and porous wafer. There are several suitable gelling agents but sodium carboxymethyl cellulose has been found to give good results since it is quite stable in the presence of the concentrated alkaline electrolyte and an adequate gel can be formed with but small amounts of the compound.

The electrolyte, as such, does not appear as an element in the drawings. The electrolyte is essentially a water solution of an alkaline hydroxide, preferably sodium or potassium hydroxide; of the two, potassium hydroxide is preferred. A satisfactory cell constructed in accordance with this invention can be produced with a potassium hydroxide or sodium hydroxide (or a mixture of the two) electrolyte solution. Certain variations are permissible, although the use of such variations insofar as they involve substitution for potassium hydroxide or sodium hydroxide, are not preferred. Thus, lithium hydroxide or even alkaline earth hydroxides may be employed in the form of solutions as the electrolyte. While the use of the more common potassium or sodium hydroxides alone produce satisfactory results, even better results are obtained by careful control of the concentration of the electrolyte solution and by modifying the alkaline hydroxide electrolyte solution by adding zinc oxide, dissolved in the electrolyte as zincate. When the zinc is added to the electrolyte in the form of zinc oxide there is produced a solution of the zincate of the alkaline metal, present in the electrolyte as hydroxide. For example, where the electrolyte comprises a solution of potassium hydroxide and zinc oxide is added to the solution, zinc oxide reacts with some of the potassium hydroxide to form potassium zincate in the solution. When so added, the chemical reaction by which the zincate is formed is reversible. It has been found, contrary to prior art teachings, that the amount of dissolved zinc oxide required for beneficial results varies inversely with the concentration of the electrolyte. The more concentrated electrolytes require less dissolved zinc oxide and produce an electrolyte characterized by a practical minimum rate of gas generation; they are, however, relatively more viscous and less conductive. The less concentrated electrolytes have greater conductivity, are somewhat easier to distribute within the cell and require larger quantities of dissolved zincate. In general, the zinc oxide added to form the zincate in solution is a minor fraction of the amount of zinc oxide required to form truly saturated solutions of zincate in the electrolyte. As an example, a suitable electrolyte may be composed by using 100 parts, by weight, of potassium hydroxide, 100 parts, by weight, of water, and 5 parts, by weight, of zinc oxide. The electrolyte solution is formed by using chemically pure potassium hydroxide, containing 85 percent or more potassium hydroxide, computed on a dry basis, dissolving the potassium hydroxide in sufficient water to form a solution, dissolving the desired amount of pure zinc oxide in this solution, using heat if necessary to insure complete solution of the zinc oxide, and then adding make-up water to give the desired relative amounts of water, dissolved potassium hydroxide and dissolved potassium zincate.

In assembling the positive sub-assembly, as shown in the upper half of Figure 2, the pellet can 4 may be spot welded to the positive cap 1 in such a manner that the pellet can is properly centered on the interior face of the positive cap. The depolarizer mix is then pressed or formed into a pellet 5 which is preferably of substantially the same dimensions as the interior of the pellet can. Desirably, the depolarizer pellet is moistened during formation, or immediately after it has been pressed within the pellet can, and is then subjected to compression so as to tamp the pellet firmly and solidly in place within the pellet can. Desirably, as a result of these operations, the outer surface of the depolarizer pellet will lie very slightly below the outer edges of the pellet cup. The remainder of the cell may then be assembled as disclosed in detail in copending application Serial No. 103,593.

With the positive sub-assembly having been prepared as indicated above, and the negative sub-assembly having been prepared with one end of the insulating spool crimped in position within the negative cap, the two sub-assemblies appear as shown in Figure 2. The required amount of electrolyte is then metered into the open end of the bore of the insulating spool in the negative sub-assembly. The metered amount of electrolyte is absorbed by the absorbent wafer and the subjacent zinc pellet in the negative sub-assembly. The positive sub-assembly is then turned over so that its inner face is opposed to the inner face of the negative sub-assembly, the depolarizer pellet can is slid into the bore of the insulating spool and sufficient pressure is exerted so that the, as-yet-unsealed, open end of the insulating spool presses firmly against the seal or gasket 7 in the annulus between the pellet cup and the positive cap. While being held together under this pressure, the edges of the positive cap are crimped firmly around the upper lip of the insulating spool.

The positive and negative sub-assemblies of the cell are now insulated from each other by the insulating spool yet are each held firmly in position by having the positive cap 1 and negative cap 2 both crimped around the lips of the insulating spool. The marginal ends of the insulating spool are sealed within the caps and to the interior faces of the negative cap and the positive cap respectively. Within the cell, the depolarizer pellet, held in position within the depolarizer pellet cup, is in physical contact with the absorbent wafer and the absorbent wafer is in physical contact with the zinc pellet. The zinc pellet is in conductive contact with the negative cap and the electrolyte-wet absorbent wafer. The depolarizer pellet is in electrical contact with the electrolyte-wet absorbent wafer and, through the depolarizer pellet cup, is in electrical contact with the positive cap.

Certain modifications in the foregoing sequential steps may be employed. Thus, in preparing the positive sub-assembly, it has been found that instead of prefabricating a depolarizer pellet from the mixture of depolarizer compounds and then moistening the preformed pellet, either before or after insertion into the depolarizer pellet can, it is possible and in some cases desirable to meter a desired amount of loose depolarizer mix directly into the pellet can and then by placing the mix under pressure, consolidate the mix into a pellet formed in situ in the depolarizer pellet can. Where the depolarizer pellet is preformed, it is preferable to pre-wet the mix with the electrolyte before inserting the pellet into the depolarizer pellet can. It has also been found desirable in some instances to insert the depolarizer pellet into the can or form the pellet in situ within the can, as explained above, before the depolarizer pellet can is welded to the positive cap. Thus, the depolarizer cup may first be welded to the positive cap and then filled with the depolarizer or the depolarizer cup may be filled with depolarizer and the filled cup and then welded to the positive cap.

Preparation of materials

In preparing the depolarizer-cathode, finely divided manganese dioxide and finely divided graphite are the preferred materials. Where the symbols $MnO_2$ are used in this specification, they will be understood to mean a product which largely consists of the dioxide of manganese as such but which neither consists exclusively of the chemically pure dioxide (100% $MnO_2$) nor contains any significant amounts of oxides of manganese in chemical combination with the oxides of other metals as permanganates. The relative proportions of graphite to $MnO_2$ may vary within certain ranges, depending upon the use for which the cell is designed and depending also upon the source, purity and physical properties of the several depolarizer materials. Thus a permissible range of between about 2 parts to about 50 parts, by weight, of $MnO_2$ may be employed for each 1 part, by weight, of graphite. A narrower range of between about 6 parts to about 30 parts of $MnO_2$ for each part of graphite, on the same weight basis, is preferred.

In general the selection of $MnO_2$ from a particular source will be largely governed by the use for which a given cell is designed and by its adaptability for admixture with graphite and other depolarizer materials in forming a mass which is sufficiently strong to withstand the handling required in assembling the cell. After considerable testing, it has been found that $MnO_2$ from some natural ores as well as some artificially prepared $MnO_2$ may be used. The type and quantity of graphite employed may also be varied if the considerations governing the selection of $MnO_2$ are likewise observed. The graphite may, for some purposes, be replaced wholly or in part with certain types of conductive carbon blacks and may also be partially replaced by finely divided or powdered inactive metals, such as iron and nickel.

For some cell uses it has been found desirable to add mercuric oxide, $HgO$, to the depolarizer mix, as a partial replacement for a portion of the $MnO_2$. For certain extreme uses as much as 75% of the $MnO_2$ may be replaced by $HgO$ but smaller amounts are preferred. It has been found that where $HgO$ is used in the mix it should be present as a replacement for not less than about 25% of, and not more than about 75% of, the $MnO_2$.

The preferred ratio of materials in the depolarizer-cathode mix may be expressed as follows (all figures being parts by weight):

A. From 1 part of graphite to about 6 parts of $MnO_2$ 1 part of graphite to about 30 parts of $MnO_2$, or B. From 1 part of graphite to about 6 parts of between 1 to 3 parts $MnO_2$ + 3 to 1 parts $HgO$, to 1 part of graphite to about 30 parts of between 1 to 3 parts $MnO_2$ + 3 to 1 parts $HgO$.

It should be understood that the graphite in the foregoing tables may be replaced by conductive carbon black and may partially be replaced by inactive metals. However the presence of copper or its oxides should be avoided.

In all of the depolarizer-cathode mixes referred to above the materials to be mixed should be of small particle size. For the graphite, an average particle size of between about $5\mu$ and about $10\mu$ has been found most satisfactory. For the $MnO_2$, an average particle size of between about $5\mu$ and about $10\mu$ has given satisfactory results with indications that somewhat better results are obtained with average particle sizes of $10\mu$ and slightly higher, even up to $25\mu$. This may be illustrated somewhat differently by saying that finely divided $MnO_2$ 98% of which passes through a 200 mesh screen and 85% of which passes through a 300 mesh screen has a satisfactory average particle size.

In preparing the depolarizer pellets from the above described materials, the selected materials should first be very intimately mixed to form a homogeneous mass. One method of performing this admixing is to feed the selected proportions of dry powdered $MnO_2$ and powdered graphite into a double cone type mixer and therein forming a homogeneous powder. The mixing should be thoroughly performed since the materials of substantially different densities are being processed. When thoroughly mixed, the homogeneous powder is then preferably densified. This may be accomplished either by moistening the powder slightly or by omitting any moistening, and pressing the powder into large pellets or slugs. Fairly high pressures, such as may be imposed by a tabletting machine or by a hydraulic press should be utilized in forming the slugs. The slugs are then ground up to form small granules, which nevertheless are more free-flowing and dense than the initial powders. The step of forming slugs and re-grinding the slugs to form dense powders may be repeated as often as may seem desirable to produce a homogeneous, densified mix.

The homogeneous, densified mix may either be charged as such into a pellet cup and tabletted therein in situ, or may be compressed into preformed depolarizer pellets. Preformed pellets may be made on a tabletting machine employing pressures of between about 20,000 to about 30,000 pounds per square inch. When so formed, the completed pellet should be dense enough to withstand considerable handling so that it may be inserted within a pellet cup without breakage or marginal chipping. In fact, it is desirable, after the preformed pellet has been inserted in the pellet cup, to subject the inserted pellet to further compression under pressures of slightly above about 20,000 to about 30,000 pounds per square inch. This further compression may be under steady pressure or by impact. This step not only serves to compact the pellet within the cup, but also serves to smooth and flatten the exposed face of the pellet and depress the exposed face below the marginal lips of the pellet cup wall. Where the powdered densified mix is charged into the pellet cup, the pellet may be formed in situ by compacting under steady or impact pressures of slightly higher magnitude than the pressures used in preforming pellets.

Mention has been made above, of moistening the depolarizer mix. This procedure, which may be termed "pre-wetting," may be employed in certain variations. It is preferable to use, as the pre-wetting liquid, a solution which is similar to the cell electrolyte in nature and concentration. An excellent pre-wetting liquid is the selected electrolyte. For some purposes, an alkali metal hydroxide solution of approximately the same concentration of the same alkali metal hydroxide used in the electrolyte, but without any zinc oxide, as zincate, dissolved therein is preferred. However, the concentration of the pre-wetting liquid need not be the same as the concentration of the electrolyte. For instance, where the electrolyte solution, containing zincate, has a concentration of 43% KOH (dry weight basis) a pre-wetting solution of KOH, without zincate, of 30% to 25% (dry weight basis) or even lower, is very satisfactory.

It will be understood that the amount and concentration of the pre-wetting liquid added to the depolarizer mix will be very carefully controlled so that the aggregate amount and average concentration of the combined pre-wetting solution and subsequently added electrolyte will be properly adjusted.

Figure 3:
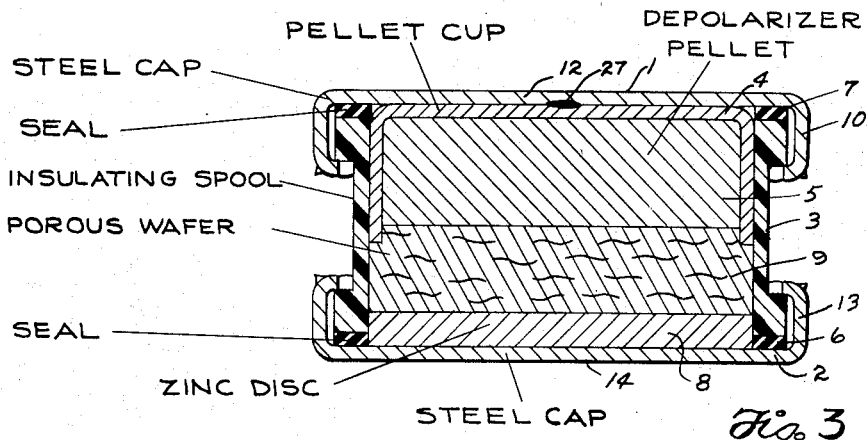
Figure 3 is a side elevational view in cross-section of the assembled cell.
Figure 4:
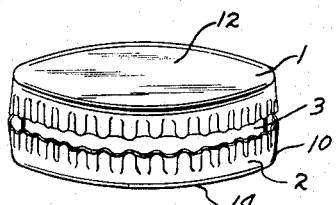
Figure 4 is an exterior view of the assembled cell taken from a position to one side and slightly above the cell.
Figure 5:
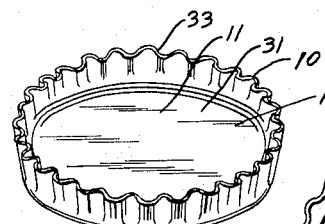
Figure 5 is a detail view of one of the caps, usable on either end of the cell, as viewed from a position to one side and slightly above.
Figure 6:
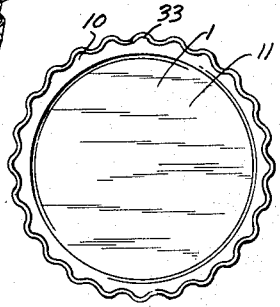
Figure 6 is an interior plan view of the cap shown in Figure 5.
Figure 7:
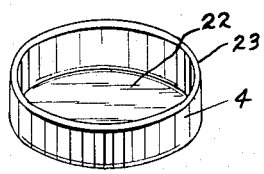
Figure 7 is a detail view of one of the pellet cups taken from a position to the side and slightly above.
Figure 8:
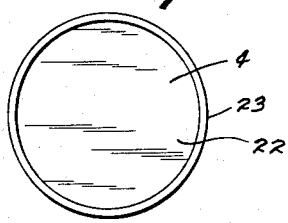
Figure 8 is an interior plan view of the pellet cups shown in Figure 7.
Figure 9:
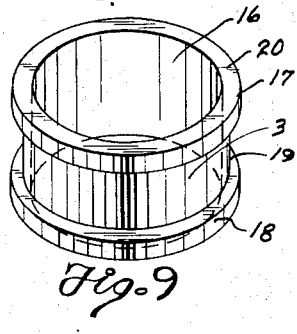
Figure 9 is a detail view of the insulating spool taken from a position to the side and slightly above.
Figure 10:
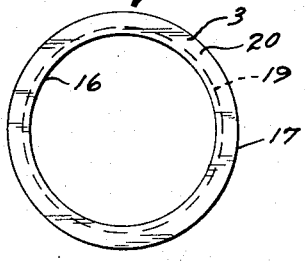
Figure 10 is a vertical plan view of the insulating spool shown in Figure 9.
Figure 11:
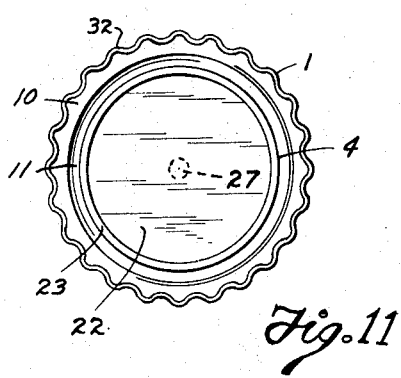
Figure 11 is an interior plan view of the cap, similar to Figure 5, but having positioned thereon the pellet cup.

The characteristics and size of the porous wafer 9 are of considerable importance. The wafer preferably should be shaped in the form of a disc having a diameter just slightly larger than the interior bore of the insulating spool. Its height or thickness should be slightly greater than the distance between the otherwise opposed interior surfaces of the depolarizer pellet 5 and the anode pellet 8 when the cell is in completely assembled condition (Figure 3). When so dimensioned, the wafer will be slightly compressed in the final assembly of the cell and will completely fill the space formed between the inner exposed surfaces of depolarizer pellet, anode pellet, insulating spool side wall, and marginal rim of the pellet cup. It should be understood that the foregoing dimensional requirements for the porous wafer should be satisfied both when the wafer is dry and when wetted with electrolyte.

The amount and concentration of the electrolyte are also factors of considerable importance. From a broad viewpoint, the electrolyte is primarily a solution of an alkali metal hydroxide dissolved in water. The more common sodium hydroxide and potassium hydroxide may be used with practically equal facility, but of the two, potassium hydroxide is preferred in spite of its relatively higher cost because of its relatively greater conductivity. The aspect of cost tends to discourage the use of the other less common alkali metal hydroxides, such as lithium or caesium, but such hydroxides are satisfactory in performance and may be used. The concentration of the hydroxide, as determined on a dry weight basis, in a given solution, may vary within a considerable range. Concentrations of between about 20 percent KOH to about 75 percent KOH may be employed. In general, somewhat better conductivity is experienced at lower concentrations. A preferred concentration is about 45 percent KOH, or within a narrower range of 30 percent to 50 percent KOH.

It has been found that the performance of the cell under a wide variety of conditions is greatly improved by adding to the alkaline hydroxide solution minor amounts of zinc oxide to form, in solution, a mixture of the alkali metal hydroxide and the corresponding alkali metal zincate. The prior art and the published literature on this subject are not altogether in accord as to the amounts of zinc oxide required to saturate given solutions of alkali metal hydroxide. As the result of numerous tests, it is the belief of the present inventor and his associates that a solution consisting of 100 parts of water and 100 parts of potassium hydroxide (dry weight basis) can dissolve considerably more than 20 parts, by weight, of zinc oxide without forming a super-saturated solution or one which will precipitate the zinc salts. In other words, in such a solution, 20 parts by weight of added zinc oxide do not completely saturate what is initially a 50 per cent potassium hydroxide solution. The present invention proposes to add zinc oxide to the potassium hydroxide (or other alkali metal hydroxide) solution, in amounts which are far less than those required to saturate the solution with potassium zincate. In general, it is preferred to use, as the electrolyte solution, an alkali metal hydroxide solution which contains in solution between about 2 parts by weight and about 10 parts by weight of dissolved zinc oxide for each 100 parts of alkali metal hydroxide originally present. Such solutions, illustrated with potassium hydroxide, may be prepared by dissolving in a small amount of water sufficient chemically pure potassium hydroxide pellets (which may contain 88 percent KOH on a dry weight basis, and about 12 percent water and minor impurities), dissolving zinc oxide therein and then adding enough water to adjust the concentration of the potassium hydroxide solution to the desired figure.

By way of example, a small amount of water, say 50 grams, is added to 114 grams of 88% C. P. KOH pellets. This mixture will consist of 100 grams of KOH (dry weight) and 50 plus 14, or 64 grams of water. The mixture is heated to 150° C., at which temperature all of the KOH will have quickly gone into solution. To this solution, at this temperature, are added 5.57 grams of ZnO, which dissolves rapidly. This solution is then cooled to about 90° C. and 36 grams of water are added to make the desired final electrolyte solution. This final solution will contain 101.22 grams of water having dissolved therein, as such, 92.33 grams of KOH and 12 grams of $K_2ZnO_2$, each on a dry weight basis. The final solution will contain 48% KOH and 10.6% $K_2ZnO_2$, based on the water and each salt separately computed. The weight ratio of KOH to $K_2ZnO_2$ in the solution is 92.33 to 12 or approximately 8 to 1. The foregoing is clear from the equation:

$$2KOH + ZnO \rightarrow K_2ZnO_2 + H_2O$$

$$112 + 81.4 \rightarrow 175.4 + 18$$

In compliance with this equation, the added 5.57 grams of ZnO consumes 7.67 grams of KOH and produces 1.22 grams of water while forming 12 grams of $K_2ZnO_2$. The original 100 grams of KOH in the solution is reduced by 7.67 grams leaving 92.33 grams of free, uncombined, dissolved KOH. The original 100 grams of $H_2O$ in the solution is increased by 1.22 grams, leaving 101.22 grams of $H_2O$ in the solution.

If a solution of 100 grams of KOH in 100 grams of $H_2O$ is similarly prepared, but with the addition of 2 grams of ZnO the final solution will contain 100.44 grams of $H_2O$, 97.25 grams of KOH as such, and 4.31 grams of $K_2ZnO_2$ as such, in solution. The concentration of uncombined, dissolved KOH is 49.3% and the concentration of $K_2ZnO_2$ is 4.12%. The weight ratio of KOH to $K_2ZnO_2$ in this solution is 22.5 to 1. In general, KOH to $K_2ZnO_2$ weight ratios of from about 3.5 to 1 to about 10 to 1 are preferred, although ratios of from about 3.1 to 1 to about 25 to 1 may be employed.

As stated above, the amount of zincate which is required to saturate any given potassium hydroxide solution is not fully established by the literature. It is possible that the reason for this lies in the failure of prior art workers to mention the temperature at which the given solutions were formed or subsequently maintained. Additionally, prior art workers seem to have ignored the chemical fact that the formation of potassium zincate by the addition of zinc oxide uses up some of the potassium hydroxide in the solution and liberates water thereby modifying the actual potassium hydroxide concentration in the final solution. To avoid any ambiguity, the recommended electrolyte solution in this specification is to be understood as consisting of the three components—water, potassium hydroxide, and potassium zincate, each computed as such and existing as such in the ultimate solution. The presence of potassium zincate in the potassium hydroxide electrolyte is intended to reduce attack on the zinc anode and to keep gassing within the cell to a practical minimum. The foregoing considerations are partially achieved by increasing the concentration of potassium hydroxide in the electrolyte solution but are augmented by the presence of dissolved zincate. In general, the amount of dissolved zinc oxide present as zincate and required for optimum results varies inversely with the concentration of the electrolyte. Thus, the more concentrated electrolytes require less dissolved zinc, present as zincate, while the less concentrated electrolytes require appreciably more dissolved zincate. In any event, the amount of zincate provided for in the present electrolyte is very much less than 50 percent of the amount of zincate required to saturate the given electrolyte solution.

While it is recognized that the numerical dimensions of mechanical objects are not normally the subject of specifications, the use of certain dimensions in describing an illustrative example of the present invention will be very helpful. Referring to Figure 1 of the drawings, as to this one form of the cell, the positive and negative caps 1 and 2 have, when crimped, a width of ½ inch. Referring to Figure 3 of the drawings, the assembled cell, from the top of the positive cap to the bottom of the negative cap, has a thickness of approximately ¼ inch. The interior bore of the insulating spool has a diameter of approximately ⅜ths of an inch. The pellet cup has a depth of slightly less than ⅛th of an inch. From these dimensions, it will be seen that the complete cell is quite small and that the anode pellet and porous wafer are quite thin. Within a cell of the dimensions given hereabove, there may be utilized a total of .22 grams of electrolyte solution. In pre-wetting the depolarizer pellet, it is preferred to use .06 grams of electrolyte solution. Thus, in assembling the cell, .06 grams of electrolyte are added as pre-wetting liquid in the depolarizer pellet, also a drop or two, barely measurable in amount, may be added in pre-wetting the zinc anode pellet. The remainder consisting of approximately .16 grams of electrolyte, is metered onto the porous spacer immediately prior to final assembly of the cell. It has been found that when the electrolyte is added in such increments to the depolarizer pellet and to the anode pellet, the porous wafer tends to retain the optimum amount of absorbed electrolyte. In other words, the essentially porous anode pellet and the considerably less porous depolarizer pellet do not absorb electrolyte thereby leaving the porous wafer impoverished with respect to absorbed electrolyte. Reference was made above to the desired property of the porous wafer of retaining absorbed electrolyte without shrinkage even during prolonged exposure to a relatively concentrated potassium hydroxide solution. It may be stated more specifically, that the porous wafer should retain, for optimum results, a minimum of .14 grams of electrolyte for a cell of the dimensions given above.

In describing the improved cell, which is the subject matter of this application, certain variables and equivalents have been given from time to time for several of the elements of the cell. For the sake of illustration, a preferred completed cell may consist of a plain steel positive cap 1, a tin-plated negative cap 2, a methyl methacrylate plastic, such as Lucite, insulating spool, a plain steel pellet cup 4, and a pelleted, amalgamated zinc powder, anode 8. The depolarizer cathode pellet 5 may consist of 1 part graphite to (20 parts of $MnO_2$ and 10 parts of HgO) each by weight, pelleted as described herein and pre-wet with a small amount of the electrolyte. The porous wafer is of Webril and the electrolyte has a final concentration of 48% KOH and a final concentration of 10.6% $K_2ZnO_2$; the latter two dissolved components being present in a weight ratio of 8 to 1. The primary seal at each end of the cell is a neoprene washer, and the secondary seal is a thin coating of petrolatum applied to each end of the insulating spool just prior to capping.

In this typical cell a modified proceeding of forming the electrolyte solution is desirably employed. The pure zinc oxide powder is moistened with sufficient (measured amount) water to form a pasty suspension. The measured amount of pure solid KOH (pellets of known purity and water content) is added to the zinc oxide paste. The mixture is then heated to about 150° C. at which temperature both solids readily dissolve in the water present, attended, of course, by the desired chemical reaction between the zinc oxide and part of the KOH. The clear solution is cooled to about 90° C. and sufficient make-up water is added to give the desired concentration. The solution is then filtered to remove any solid impurities such as dust particles and cooled to room temperature.

*Mode of operation*

The cell system used in the cells described above may be written as $Zn/KOH/MnO_2$. The voltage of cells with this system is about 1.52 when new, and decreases in a few weeks at room temperature to a normalized value of about 1.48 volts. The voltage varies slightly with the type of manganese dioxide used and also with the ratio used in the depolarizing mix. Higher ratios of manganese dioxide give cells of slightly higher voltages.

At the zinc anode, the zinc is converted during discharge into a soft paste of ZnO or ZnO hydrates. Although the electrolyte is far from saturated with zincate, the rate of solution of the ZnO is so slow at room temperature that very little dissolves to form the zincate. The color and form of the ZnO varies considerably with the drain. At relatively high drains, the ZnO is medium to dark blue and is quite firm. At relatively low drains, the ZnO is in the form of a soft light blue paste.

The depolarizer is used mainly according to the reaction $$2MnO_2 \rightarrow Mn_2O_3 + 2F$$ 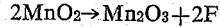

During use, the depolarizer changes from a black to a brown color; the degree of brownness roughly indicating the extent to which the cell has been discharged. The above conversion takes place at a relatively high efficiency of about 90 to 100 percent at moderate drains and to the lower end points such as .90 and .80 volts per cell. On very low drains and to low end points, the depolarizer becomes a yellow-red color, probably due to the formation of some Mn oxides lower than $Mn_2O_3$. During discharge, the depolarizer gradually absorbs electrolyte from the absorbent layer and expands considerably in height, the amount of expansion being a very good indication of the extent to which the cell is used. At the same time, a very hard crust is formed on the surface of the depolarizer.

Both the total amount of electrolyte and the ratio of electrolyte to absorbent are very important in these cells in order to obtain the highest capacity and greatest efficiency. It is usually desirable to use an absorbent which will give a high ratio of absorbed electrolyte to absorbent since the cells are usually made with the total amount of electrolyte near the lower critical limit to avoid excessive migration of electrolyte within the cell. Because of this factor, it is desirable to have some electrolyte initially in the depolarizer, thereby increasing the total amount of electrolyte and also improving the capacity of the cells when subjected to relatively heavy drains. During discharge, the electrolyte from the absorbent is absorbed by both the ZnO and depolarizer, mostly by the latter. During use, the absorbent continually becomes drier and is compressed more by the expansion of both the depolarizer and the conversion of Zn to ZnO at the anode. At the end of the cells' useful life, the absorbent is almost completely dry. The latter is a very important effect since no leakage can occur after discharge, and such cells really become incapable of leaking. This is the direct opposite effect from that sometimes occurring in Leclanche-type dry cells which tend to leak after discharge has been completed.

Cells made according to the above described construction and composition have very high capacity per unit volume. In fact, this factor is about 2 to 3 times that of Leclanche-type dry cells of the same size, the ratio depending slightly upon the drain. The discharge curve is about the same as for the Leclanche dry cell, but is slightly flatter in the middle portion. Because of the high efficiency in the conversion of the $MnO_2$ into $Mn_2O_3$, the capacity of cells can be readily calculated from the A-hr. rating which depends directly on the amount of depolarizer and zinc. The efficiency usually decreases a slight amount as the drain is increased within the normal range suitable for a particular size of cell. A cell of about ½ inch in diameter and slightly less than ¼ inch high has a capacity of about 150 ma.-hr. at drains of 2 ma. or less. Because the terminals are at opposite ends, such cells are admirably suited for making higher voltage "B" batteries by simply stacking one on the other. This method of cell assembly is easy and provides a cheap battery construction.

During discharge, there is a slight expansion in the external height of the cell. However, most of the considerably greater expansion of the depolarizer and of the conversion of zinc to ZnO at the anode is taken up by compression of the absorbent. This effect has a definite advantage since the internal pressure within the cell increases during discharge, thus insuring good contacts, and the reduced thickness of the absorbent keeps the internal resistance low, even when the electrolyte is being absorbed from the absorbent by the anode and cathode. A slight external expansion is also advantageous since it helps maintain good contacts between the cells in battery stacks.

The most desirable depolarizer ratio depends considerably on the drain for which the cells are to be used. The capacity of the cells also depends considerably on the packing factors of the various ratios of depolarizing mix. In order to insure complete use of the depolarizer, an excess of zinc in the anode is used, this excess usually being about 20 to 30 percent. The exposed area of the zinc anode also has an important effect on the permissible drains of the cells. For most applications, a highly porous zinc pellet is preferred since it has a relatively large surface area and also holds some electrolyte. For very light drains, a flat zinc plate or a series of such plates is quite satisfactory.

Small cells made according to the above construction and composition find very suitable applications in "B" batteries for hearing aids, pocket and small portable radios. Larger cells may be used as "A" batteries for hearing aids and pocket radios and also as "B" batteries for larger portable radios. There are also many military uses for this type of cell since such cells have a high efficiency at relatively high drains and are small in volume and of light weight. In many other applications, these cells will give about twice the capacity of the ordinary Leclanche dry cells for the same volume, or batteries of about the same capacity can be made which are about one-half the size of the conventional dry cell batteries.

I claim:

1. In a process for preparing a depolarizer-cathode mass for alkaline dry cells the steps which comprise homogeneously mixing graphite of small particle size with a major amount of a metallic oxide compound from the group consisting of manganese dioxide and mixtures of manganese dioxide with mercuric oxide, moistening the mixture with an aqueous solution containing an alkaline metal hydroxide and compressing the moistened, homogeneous mixture under a pressure of between about 20,000 and about 30,000 pounds per square inch to form a coherent mass capable of being supported within a metallic pellet cup.

2. The process of claim 1 wherein the aqueous solution is an increment of the alkaline electrolyte with which the depolarizer-cathode is adapted for use.

3. A homogeneous, compressed depolarizer-cathode mass for use in alkaline dry cells which comprises a mixture of graphite having an average particle size not greatly exceeding $10\mu$ and a metallic oxide compound having an average particle size not greatly exceeding $25\mu$, said graphite being present in an amount of 1 part by weight for between about 2 parts and 50 parts, by weight of the metallic oxide present, said metallic oxide being selected from the group consisting of manganese dioxide and mixtures of manganese dioxide with mercuric oxide.

4. The compressed depolarizer mass defined in claim 3 wherein the said mixture of manganese dioxide with mercuric oxide contains mercuric oxide and manganese dioxide in the proportions, by weight, between about 1 part of HgO for about 3 parts of $MnO_2$ and about 3 parts HgO for about 1 part of $MnO_2$.

5. In an alkaline dry cell having an amalgamated zinc anode and a cathode-depolarizer containing graphite and manganese dioxide, an alkaline electrolyte which comprises a solution of alkali metal hydroxide in water, said hydroxide being initially present in an amount between about 20 percent, by weight, and about 75 percent, by weight, of the water present, and said solution containing dissolved alkali metal zincate and dissolved unreacted alkali metal hydroxide in proportions by weight which fall between the ratios of from about 3.1 parts to about 25 parts of alkali metal hydroxide for each part of alkali metal zincate.

6. The alkaline electrolyte defined in claim 5 wherein the alkali metal hydroxide is potassium hydroxide.

7. In a process for preparing a depolarizer-cathode mass for alkaline dry cells, the steps which comprises homogeneously mixing finely divided graphite with a major amount of a metallic oxide compound of small particle size selected from the group consisting of manganese dioxide and mixtures of manganese dioxide with mercuric oxide, moistening the mixture with an aqueous solution containing an alkaline metal hydroxide, compacting said moistened mixture into slugs under high pressure, comminuting said slugs into granules having free-flowing characteristics, and compressing the granules under a pressure of between about 20,000 and about 30,000 pounds per square inch to form a coherent depolarizer-cathode of sufficient strength to be self-supporting.

8. The process of claim 7 wherein the aqueous solution is an increment of the alkaline electrolyte with which the depolarizer-cathode is adapted for use.

9. The process of preparing a depolarizer-cathode mass for alkaline dry cells comprising homogeneously mixing finely powdered graphite and a major amount of a metallic oxide compound selected from the group consisting of manganese dioxide and mixtures of manganese dioxide with mercuric oxide, moistening the mixture with an aqueous solution containing an alkaline metal hydroxide, and compressing the moistened, homogeneous mixture in a pellet cup under a pressure of between about 20,000 and about 30,000 pounds per square inch to form a depolarizer-cathode pellet within the pellet cup of such coherence as to be dimensionally stable during handling.

References Cited in the file of this patent

UNITED STATES PATENTS

| | | |
|---|---|---|
| 1,098,606 | Achenbach | June 2, 1914 |
| 1,195,677 | Heil | Aug. 22, 1916 |
| 2,422,045 | Ruben | June 10, 1947 |
| 2,536,696 | Ruben | Jan. 2, 1951 |